(12) United States Patent
Yoshino

(10) Patent No.: US 6,179,932 B1
(45) Date of Patent: Jan. 30, 2001

(54) MOTOR ROTARY SHAFT AND MANUFACTURING METHOD THEREOF

(75) Inventor: Akira Yoshino, Osaka (JP)

(73) Assignee: Daidousanso Co., Ltd., Osaka (JP)

( * ) Notice: Under 35 U.S.C. 154(b), the term of this patent shall be extended for 0 days.

(21) Appl. No.: 08/227,686

(22) Filed: Apr. 14, 1994

Related U.S. Application Data

(63) Continuation of application No. 07/852,217, filed as application No. PCT/JP91/01596 on Nov. 20, 1991, now abandoned.

(30) Foreign Application Priority Data

Nov. 20, 1990 (JP) .................................................. 2-316560

(51) Int. Cl.$^7$ .................................................. C23C 8/26
(52) U.S. Cl. .................. 148/217; 148/228; 148/230; 148/231; 148/212
(58) Field of Search ................... 148/217, 228, 148/230, 231, 210, 212, 213, 220

(56) References Cited

U.S. PATENT DOCUMENTS

| | | | | |
|---|---|---|---|---|
| 4,975,147 | * | 12/1990 | Tahara et al. ........................ | 156/646 |
| 5,013,371 | * | 5/1991 | Tahara et al. ........................ | 148/231 |
| 5,112,030 | * | 5/1992 | Tahara et al. ........................ | 266/256 |
| 5,114,500 | * | 5/1992 | Tahara et al. ........................ | 148/230 |
| 5,141,567 | * | 8/1992 | Tahara et al. ........................ | 148/217 |

FOREIGN PATENT DOCUMENTS

| | | | |
|---|---|---|---|
| 2138074A | * | 10/1984 | (GB) . |
| 3312868 A1 | * | 10/1984 | (DE) . |
| 56-49417 | * | 5/1981 | (JP) . |
| 59-067365 | * | 4/1984 | (JP) . |
| 01087893 | * | 3/1989 | (JP) . |
| 01286751 | * | 11/1989 | (JP) . |
| 1-286751 | * | 11/1989 | (JP) . |
| 2-113120 | * | 4/1990 | (JP) . |

OTHER PUBLICATIONS

Supplementary European Search Report, No. EP 92 90 2473, The Hague, Jul. 22, 1993.*

* cited by examiner

*Primary Examiner*—Sikyin Ip
(74) *Attorney, Agent, or Firm*—Armstrong, Westerman, Hattori, McLeland & Naughton

(57) ABSTRACT

A motor rotary shaft according to the present invention is constructed only at the surface layer of a journal portion with a hard nitride layer, so that the resultant motor rotary shaft is available at a low cost, not so heavy and excellent in durability in comparison with a case employing a hard material for the whole motor rotary shaft. Also, a method of manufacturing a motor rotary shaft according to the present invention employs fluorinating process prior to nitriding process to change a passive coat layer such as oxide layer on the surface of the journal portion to a fluoride layer, which protects the same surface. Therefore, even when there is space of time between formation of fluoride on the surface of the journal portion and nitriding process, the fluoride layer protects and keeps the surface of the journal portion in a favorable condition, resulting in that re-formation of oxide layer on that surface is prevented.

2 Claims, 3 Drawing Sheets

MOTOR ROTARY SHAFT AND MANUFACTURING METHOD THEREOF

This application is a continuation of application Ser. No. 07/852,217 filed May 28, 1992, which is a 371 PCT/JP91/01596 filed Nov. 20, 1991, now abandoned.

FIELD OF THE INVENTION

The invention relates to a motor rotary shaft which comprises a journal portion of a hard nitride layer to have remarkably improved properties, such as durability, and also to a manufacturing method of the motor rotary shaft.

BACKGROUND OF THE INVENTION

DC (direct current) or AC (alternate current) servo motors used for an actuator in industrial robots and the like are generally required to have quick response for controlling positions of the robots quickly with high accuracy, and also sufficient durability to bear frequently repeated operation of startup, stoppage, and change of normal and reverse rotation. FIG. 4 exemplifies a DC servo motor including a general construction of the servo motor. The servo motor 20 has a motor casing 21 with left and right side walls each having bearing metal 23 with which rotatably supported are journal portions 22a of a motor rotary shaft (rotary) 22 made of steel. The motor rotary shaft 22 comprises an armature 24, an armature coil 25, a commutator 26 and the like. A permanent magnet 27 is fixed on the casing 21 at a position to face the armature 24, and the rotary shaft 22 is connected at its one end with a position/speed detector 30 and at an output portion 22b of the another end is connected with a speed reducer 29, such as gears. The servo motor 20 constructed with the above structure is required to have high durability at the journal portions 22a thereof in association with the bearing metals 23 in order to meet the aforesaid requirement.

Hence, specific kinds of steel material having high durability are selected for the motor rotary shaft 22 to improve the durability at its journal portions 22a. This, however, leads to problems such as increases in cost of material and weight.

Accordingly, an object of the invention is to improve the durability of the journal portions of the motor rotary shaft without increases in cost of material and weight.

SUMMARY OF THE INVENTION

To accomplish the above object, a first aspect of the invention is directed to a motor rotary shaft having a journal portion whose surface layer is formed into a hard nitride layer, and a second aspect of the invention is directed to a manufacturing method of a motor rotary shaft wherein a journal portion of the motor rotary shaft is held in fluorine- or fluoride-containing gas atmosphere under a heated condition for forming a fluoride layer on the surface of the journal portion, and thereafter further held in nitride atmosphere under a heated condition for forming a hard nitride layer on the surface of the journal portion.

In detail, the motor rotary shaft of the present invention is constructed at the surface layer of the journal portion with a hard nitride layer but does not employ a hard material for the whole motor rotary shaft, thereby enabling provision of the motor rotary shaft which is obtainable at a low cost, not so heavy and excellent in durability. Furthermore, in the manufacturing method of the motor rotary shaft according to the present invention, the journal portion of the shaft is first held in fluorine- or fluoride-containing gas atmosphere under a heated condition to form a fluoride layer on the surface of the journal portion, and further held in nitride atmosphere under heated condition to remove the formed fluoride layer from the journal portion and simultaneously form a hard nitride layer on the part removed (on the surface layer of journal portion). In the course of the method, formation of fluoride layer on the surface of journal portion is carried out before nitriding to purify and at the same time activate the surface of the journal portion, so that the nitride layer can be uniformly and rather deeply formed on the surfaces of the journal portion, whereby the hard nitride layer can be uniform and thick in forms of thickness.

Next, details of the present invention are described below.

Fluorine- and fluoride-containing gas to be used for fluorinating in the present invention is an inactive gas, such as $N_2$ containing at least one of the fluorine source components, such as $NF_3$, $BF_3$, $CF_4$, HF, $SF_6$, and $F_2$. $NF_3$ is most preferable and useful in respect of reactivity, handling properties, and the like for the purposes of the present invent.

Upon nitriding in the manufacturing method according to the present invention, the journal portion of the motor rotary shaft (made of steel, such as stainless steel, and with the other portion than the journal portion being masked by coating a known anti-hardening agent) is held, as aforementioned, in the fluorine- or fluoride-containing gas atmosphere under a heated condition at 250 to 400° C. when $NF_3$ is used, for example, to form a fluoride layer on the surface of the journal portion, followed by nitriding (or carbon nitriding) using a known nitriding gas, such as ammonia. The concentration of the fluorine source components such as $NF_3$ in the fluoride gas is, for example, 1000 to 100000 ppm, preferably 20000 to 70000 ppm and most preferably 30000 to 50000 ppm. The time for holding in the fluorine- or fluoride-containing gas may be selectively set corresponding to kinds of steel materials, sizes of the motor rotary shaft, heating temperatures or the like and it is generally a few minutes or scores of minutes.

The manufacturing method of the present invention will be further detailed. A journal portion 22a of a motor rotary shaft 22 shown in FIG. 4 which is made of steel and masked at portions other than the journal portion may be cleaned so as to be degreased and then placed in a heat treatment furnace 1 as shown in FIG. 1. The heating furnace 1 is a pit furnace comprising an outer shell 2, a heater 3 provided therein and an inner container 4 disposed inside the heater 3. A gas guide line 5 and an exhaust pipe 6 are inserted into the pit furnace. Gas is fed to the gas guide line 5 from cylinders 15, 16 through a flow meter 17 and a valve 18 and the like. Atmosphere inside the pit furnace is agitated by a fan 8 which is rotated by a motor 7. The motor rotary shaft 22 is held in a metallic container 11 to be placed in the furnace. In the drawing, reference numeral 13 denotes a vacuum pump and 14 a noxious substance eliminator. Fluorine- or fluoride-containing gas, for example a mixed gas of $NF_3$ and $N_2$ is injected into the furnace and heated to a predetermined reaction temperature. $NF_3$ generates active fluorine at 250 to 400° C., so that organic and inorganic contaminant on the surfaces of the journal portion 22a are removed and the generated fluorine simultaneously is reacted with Fe, chrome substrate or oxides such as FeO, $Fe_3O_2$, and $Cr_2O_3$ on the surface of the journal portion 22a as represented in the following formula, thereby forming on the surface of the journal portion 22a a quite thin fluoride layer containing therein such compounds as $FeF_2$, $FeF_3$, $CrF_2$, and $CrF_4$.

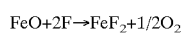

$$Cr_2O_3 + 4F \rightarrow 2CrF_2 + 3/2O_2$$

The reaction changes the oxide layer on the surfaces of journal portion 22a to a fluoride layer and removes $O_2$ adsorbed on the same surface. The fluoride layer is stable at temperatures below 600° C. when there exists no $O_2$, $H_2$, nor $H_2O$, to thereby prevent forming oxide layer and adsorption of $O_2$ on and by the metallic substrates. Also, according to the fluorinating process, the fluoride layer is formed on the surface of the furnace material at the initial stage, so that the fluoride layer thereafter prevents a possible damage to the surfaces of furnace material due to application of fluorine- or fluoride-containing gas. The journal portion 22a duly treated with fluorine- or fluoride-containing gas is further heated to a nitriding temperature 480 of to 700° C. and applied in this state with $NH_3$ gas or a mixed gas of $NH_3$ and a gas containing carbon sources (such as RX gas), whereby the aforesaid fluoride layer is reduced or broken by $H_2$ or trace amount of water as represented by the following formula, thereby causing the active metallic substrates to be formed and exposed.

$$CrF_4 + 2H_2 \rightarrow Cr + 4HF$$

$$2FeF_3 + 3H_2 \rightarrow 2Fe + 6HF$$

Simultaneously with formation of the activated metallic substrates, active N atoms enter and disperse in the metal, resulting in a solid compound layer (nitride layer) containing such nitride such CrN, $Fe_2$ N, $Fe_3$ N, and $Fe_4$ N being formed on the surfaces of the metallic substrate. Then, the foregoing masking of the rotary shaft 22 is duly removed.

The conventional nitriding process forms similar nitride layers to the above but it has lower activity on the substrate surfaces due to the oxidized layer formed thereon during elevation of temperatures from normal room temperatures to nitriding temperatures or $O_2$ adsorbed at that time, so that the degree of adsorption of N atoms on the substrates surfaces is low and not uniform. The non-uniformity is enlarged also by the fact that it is practically hard to keep the degree of decomposition of $NH_3$, uniform in the furnace. According to the manufacturing method of the present invention, adsorption of N atoms on the surface of the journal portion 22a is carried out uniformly and quickly to thereby exclude the above problem while providing the solid nitride layer.

The resultant motor rotary shaft 22 in which the surface layer of its journal portion 22a includes a hard nitride layer A as shown in FIG. 2 is thereby excellent in durability.

A servo motor 20 shown in FIG. 3 is substantially identical with that of FIG. 4 except that it uses a ball bearings 31 of the motor rotary shaft 22. In this case, the ball bearing 31 (particularly the rolling member, such as balls, and ball races) are nitrided together with the journal portion 22a of the motor rotary shaft 22 by the nitriding process according to the present invention, whereby the ball bearings 31 themselves can be reduced in frictional resistance and further rigidly fitted to the journal portions 22a.

Although steel is used for the motor rotary shaft in the above-mentioned example, metallic materials such as aluminium and titanium other than steel may be used for the motor rotary shaft and the same effect as above can be obtained.

As seen from the above, the motor rotary shaft of the present invention is constructed at the surface layer of the journal portion with a hard nitride layer but does not employ a hard material for the whole motor rotary shaft, so that it is able to provide the shaft which is obtainable at a low cost, not so heavy and excellent in durability. Also, the shaft of the present invention can reduce resistance to slide to about one third with the solid nitrided layer, to thereby be able to realize a saving of coolant or the like. Furthermore, as above-mentioned, in the manufacturing method according to the present invention, fluorinating is carried out before nitriding step to change the passive coat layer such as an oxide layer on the surface of the journal portion to a fluoride layer which protects the same surface. Therefore, even when there is space interval of time between formation of fluoride layer on the journal portion and nitriding step, the fluoride protects and keeps the surface of the journal portion in a favorable condition, such that re-formation of oxide layer on that surface is prevented. The fluoride layer is decomposed and removed in the subsequent nitriding step to cause the surface of journal portion to be exposed. Since the exposed metal surface is activated, N atoms in the nitriding step readily, deeply and uniformly penetrate and disperse into the journal portion, thereby forming the surface layer of the journal portion into a thick and uniform hard nitrided layer.

DETAILED DESCRIPTION OF THE PREFERRED EMBODIMENTS

Next, the present invention will be referred to according to an example.

EXAMPLES

Figure 1:
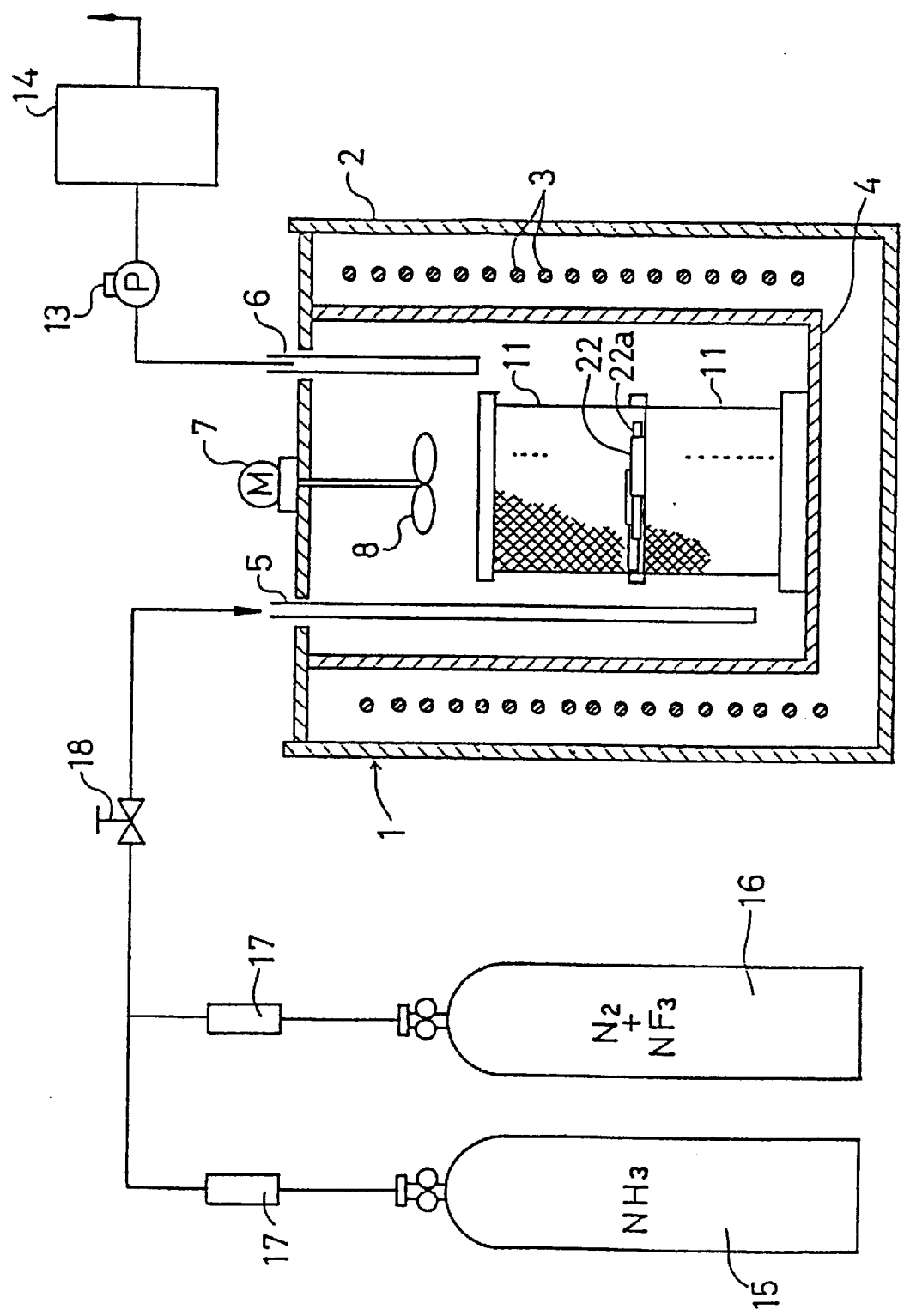
FIG. 1 is a schematic sectional view showing a heat treatment furnace used in an example of the present invention.
Figure 2:
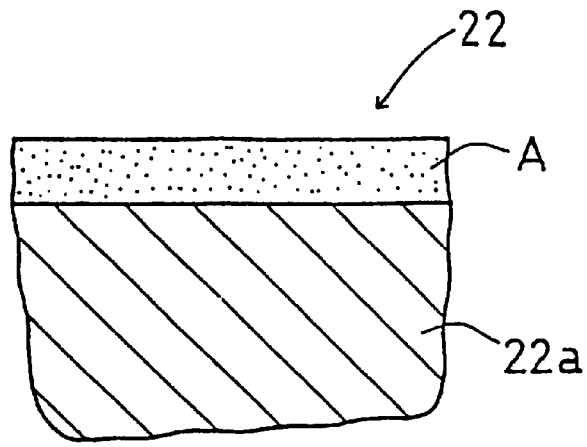
FIG. 2 is a sectional view showing a condition of a nitride layer formed on the journal portion of the motor rotary shaft.
Figure 3:
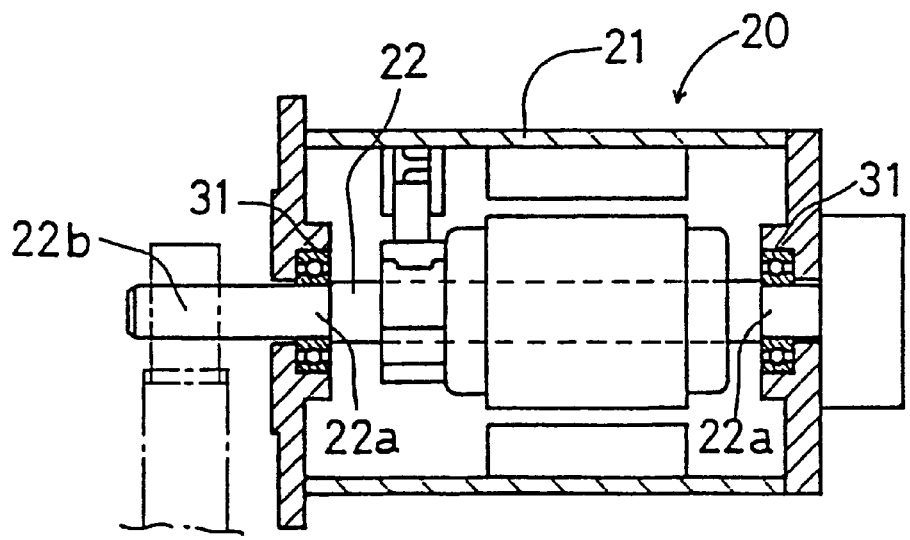
FIGS. 3 and 4 are sectional views showing a motor provided with respective motor rotary shafts.
Figure 4:
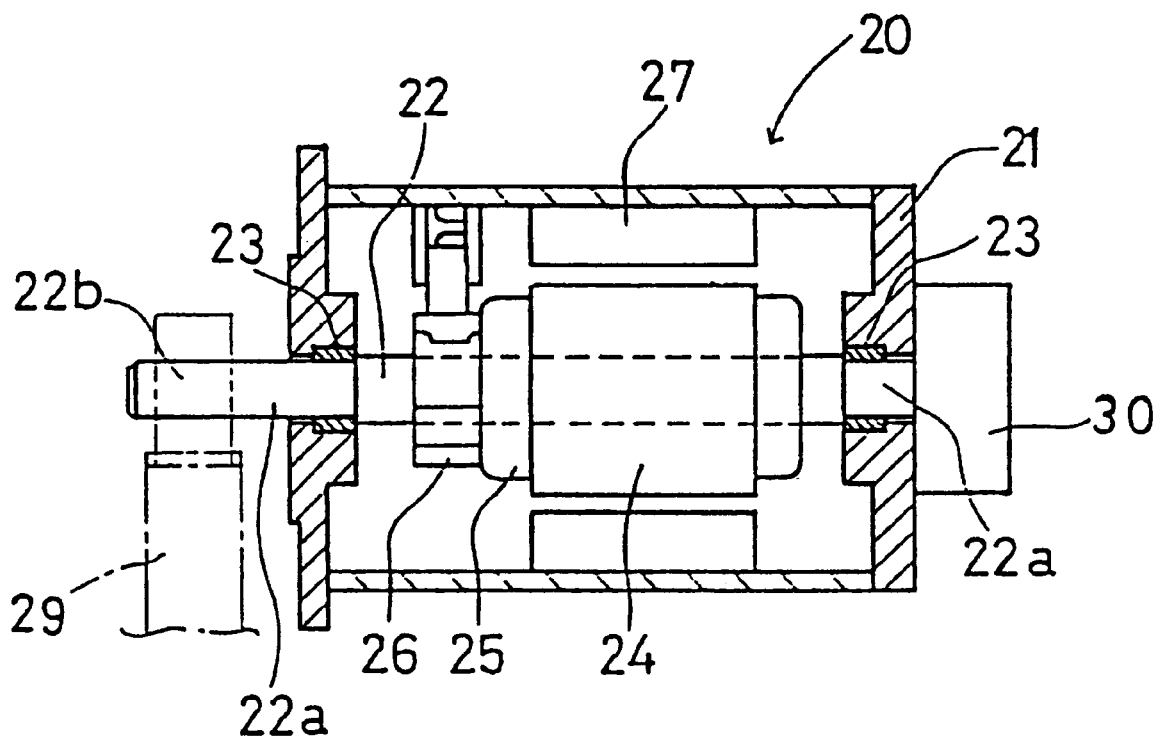

Journal portions of a motor rotary shaft (150×φ25 mm) made of SUS316 stainless steel were washed with trichloroethane. The washed shaft was masked at its portions other than the journal portions then placed in a heat treatment furnace 1 as shown in FIG. 1 to be held in $N_2$ gas atmosphere containing 5000 ppm of $NF_3$ at 300° C. for 15 minutes, followed by heating to 530° C. and a mixed gas of 50% of $NH_3$ and 50% of $N_2$ was introduced into the heat treatment furnace 1 to perform nitriding of the shaft for 3 hours. Then, the shaft was air-cooled and taken out of the furnace. Thickness of the nitride layer of the journal portion of the motor rotary shaft were 10 to 70 μm, and surface hardness of the nitride layer were 1000 to 1350 Hv and the hardness was substantially higher than that obtained by the conventional nitriding method.

What is claimed is:

1. A method of manufacturing a motor rotary apparatus containing a rotary shaft having a journal portion, the method comprising the steps of masking portions of said apparatus other than the journal portion, holding said journal portion in a fluorine- or fluoride-containing gas atmosphere under heating to form a fluoride layer on the surface of the journal portion, and thereafter further hoiding the journal portion in a nitride atmosphere under heating to form a hard nitride layer on the surface of the journal portion, and assembling on said rotary shaft an armature; an armature coil operably mounted onto said armature; and a commutator operably mounted onto said armature coil.

2. A method of manufacturing a motor rotary apparatus containing a rotary shaft having a journal portion and an associated ball bearing, the method comprising the steps of masking portions of said apparatus other than the journal portion and the ball bearing, holding said journal portion and the ball bearing in a fluorine- or fluoride-containing gas atmosphere under heating to form a fluoride layer on the surface of the journal portion and the ball bearing, and thereafter further holding the journal portion and the ball bearing in a nitride atmosphere under heating to form a hard nitride layer on the surface of the journal portion and the ball bearing, and assembling on said rotary shaft an armature; an armature coil operably mounted onto said armature; and a commutator operably mounted onto said armature coil.

* * * * *